(12) United States Patent
Tanaka

(10) Patent No.: US 11,113,013 B2
(45) Date of Patent: Sep. 7, 2021

(54) IMAGE FORMING APPARATUS FOR EXECUTING SECURE PRINT JOB

(71) Applicant: KYOCERA Document Solutions Inc., Osaka (JP)

(72) Inventor: Chigusa Tanaka, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/905,315

(22) Filed: Jun. 18, 2020

(65) Prior Publication Data

US 2020/0409622 A1 Dec. 31, 2020

(30) Foreign Application Priority Data

Jun. 26, 2019 (JP) .............................. JP2019-118066

(51) Int. Cl.
*G06F 3/12* (2006.01)

(52) U.S. Cl.
CPC .......... *G06F 3/1222* (2013.01); *G06F 3/1238* (2013.01); *G06F 3/1285* (2013.01); *G06F 3/1296* (2013.01)

(58) Field of Classification Search
None
See application file for complete search history.

(56) References Cited

U.S. PATENT DOCUMENTS

2005/0179933 A1* 8/2005 Akao .................... G06F 21/608
358/1.14
2017/0104890 A1* 4/2017 Miyazaki ............... A61B 5/117

FOREIGN PATENT DOCUMENTS

JP 2005-161841 6/2005
JP 2007-179530 7/2007

* cited by examiner

*Primary Examiner* — Thomas D Lee
(74) *Attorney, Agent, or Firm* — Lex IP Meister, PLLC

(57) ABSTRACT

An image forming apparatus includes a printing device, a controller that controls the printing device, and a print job management unit that executes a secure print job by the controller based on a job request from a user. The controller executes calibration of the printing device when the controller detects that a predetermined parameter measured from a previous calibration exceeds a predetermined value. The print job management unit, upon receiving a job request for the secure print job, determines whether or not a difference between a current value of the predetermined parameter and the predetermined value is less than a predetermined threshold, and if the difference is less than the predetermined threshold, the print job management unit cancels the secure print job.

6 Claims, 3 Drawing Sheets

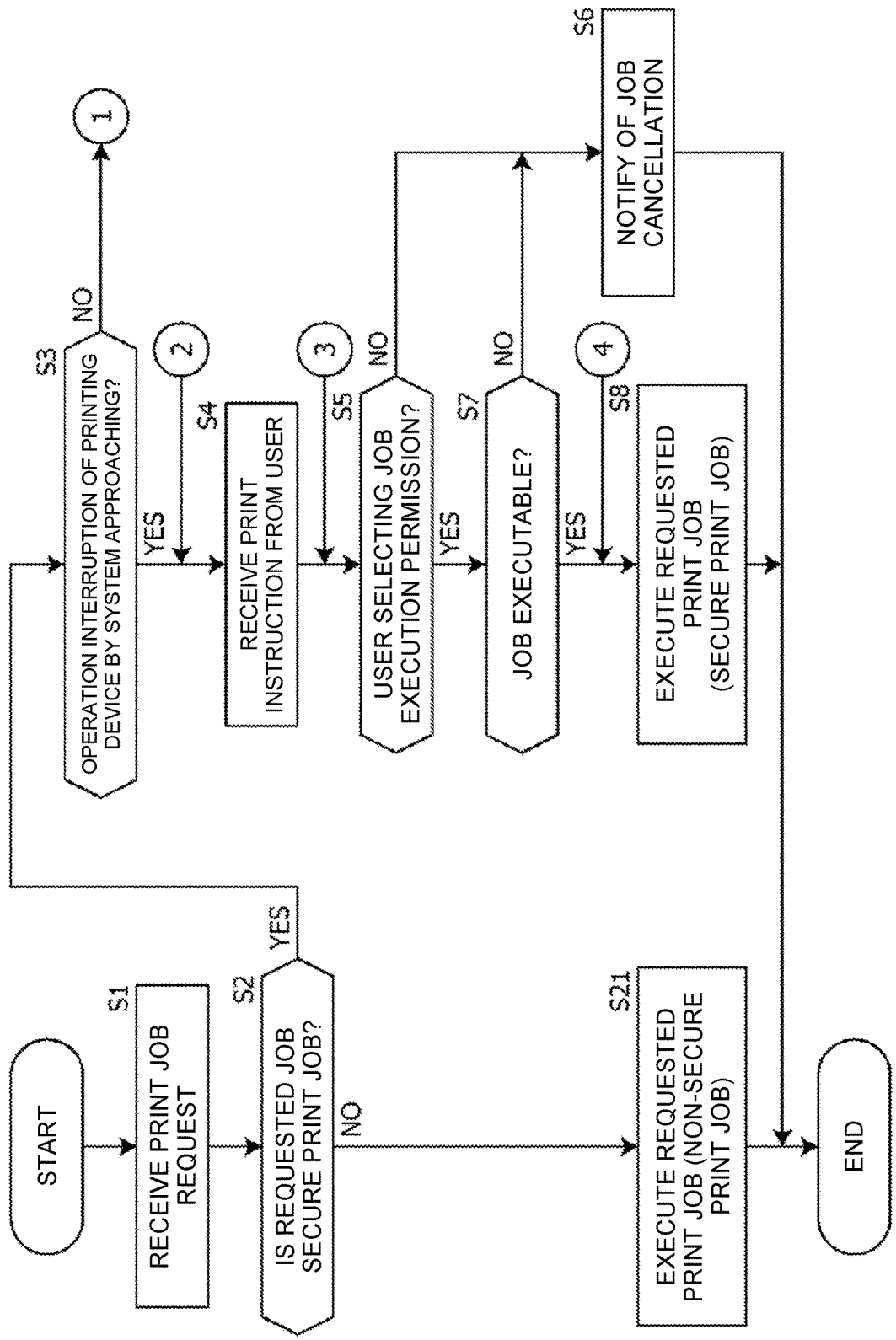

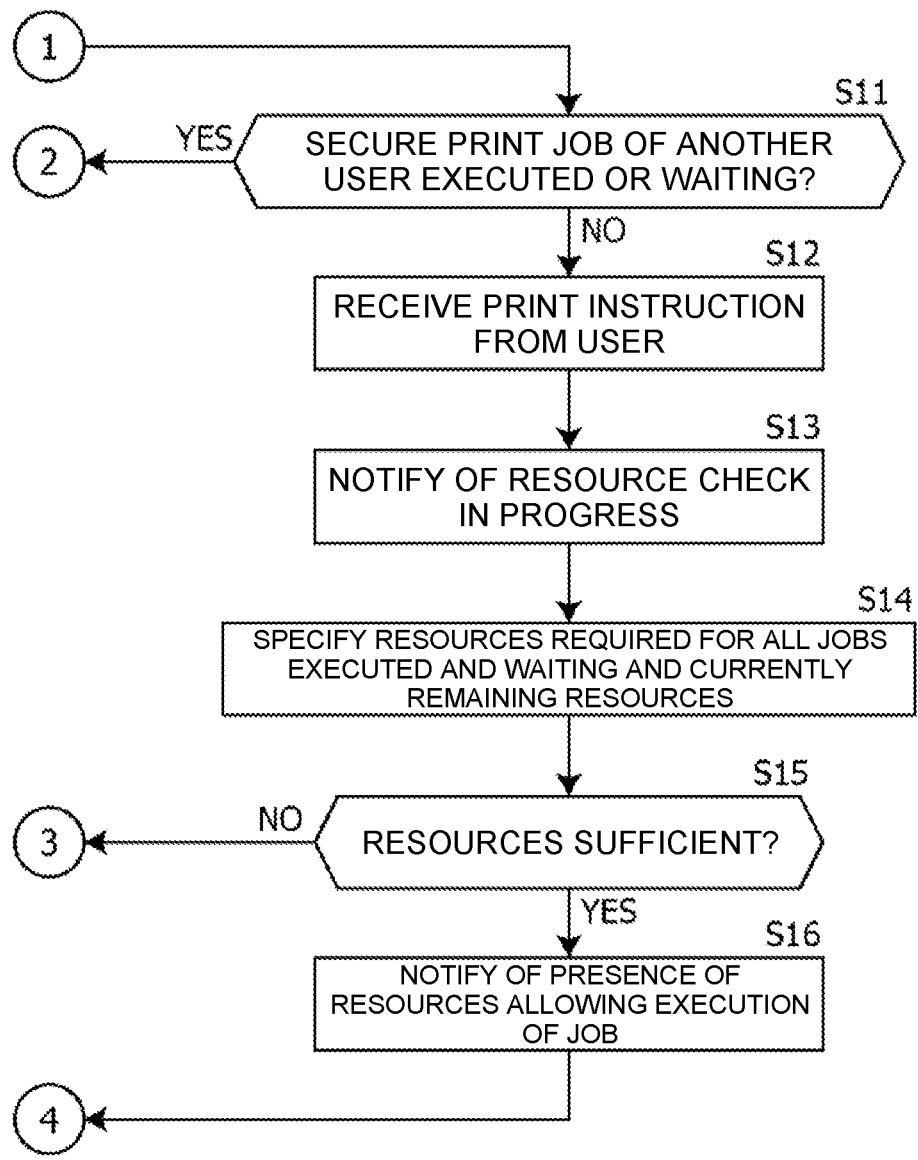

IMAGE FORMING APPARATUS FOR EXECUTING SECURE PRINT JOB

INCORPORATION BY REFERENCE

This application is based upon and claims the benefit of priority from the corresponding Japanese Patent Application No. 2019-118066 filed on Jun. 26, 2019, the entire contents of which are incorporated herein by reference.

BACKGROUND

The present disclosure relates to an image forming apparatus.

When executing a secure print job, an image forming apparatus starts printing of a document designated by the secure print job after authentication processing, and when the secure print job is interrupted, resumes the secure print job after the authentication processing.

When executing a secure print job, another image forming apparatus executes the secure print job after confirming that there are resources necessary for completion of the secure print job. When executing the non-secure print job, the image forming apparatus executes the non-secure print job even if there is no resource necessary for completion of the non-secure print job.

However, in general, a print job may be interrupted by a factor other than resource shortage in an image forming apparatus, and a secure print job may be interrupted in the above-described image forming apparatus.

The present disclosure provides an image forming apparatus having a low possibility that a secure print job is interrupted.

SUMMARY

An image forming apparatus according to the present disclosure includes a printing device, a controller that controls the printing device, and a print job management unit that executes a secure print job by the controller based on a job request from a user. The controller executes calibration of the printing device when the controller detects that a predetermined parameter measured from a previous calibration exceeds a predetermined value. The print job management unit, upon receiving a job request for the secure print job, determines whether or not a difference between a current value of the predetermined parameter and the predetermined value is less than a predetermined threshold, and if the difference is less than the predetermined threshold, the print job management unit cancels the secure print job.

BRIEF DESCRIPTION OF THE DRAWINGS

FIG. 2 is a flowchart for explaining a box print job in the image forming apparatus shown in FIG. 1 (1/2).

FIG. 3 is a flowchart for explaining a box print job in the image forming apparatus shown in FIG. 1 (2/2).

DETAILED DESCRIPTION

Figure 1:
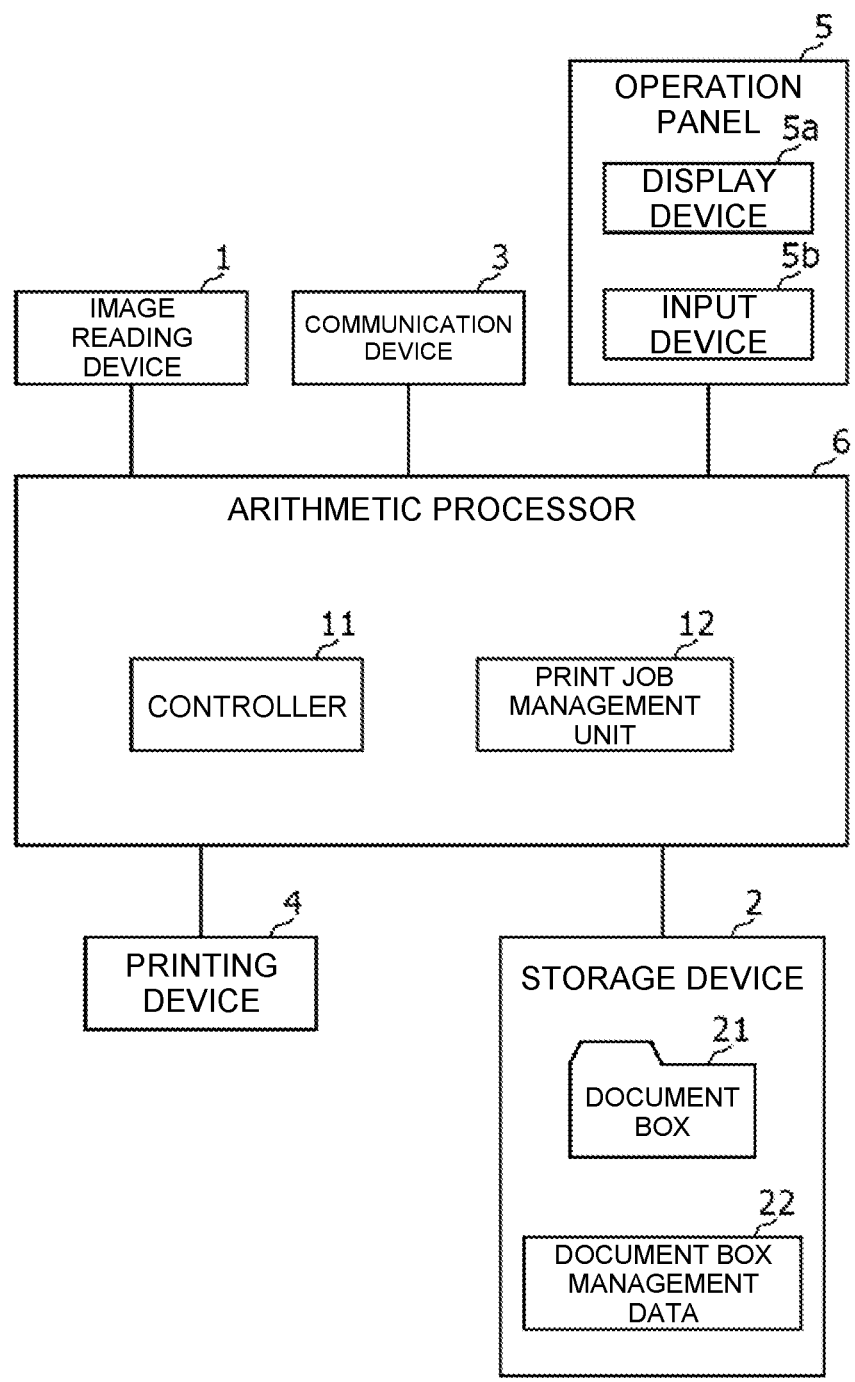
FIG. 1 is a block diagram illustrating a configuration of an image forming apparatus according to an embodiment of the present disclosure.

Hereinafter, embodiments of the present disclosure will be described with reference to the drawings.

FIG. 1 is a block diagram illustrating a configuration of an image forming apparatus according to an embodiment of the present disclosure. The image forming apparatus in FIG. 1 is an image forming apparatus such as a multifunction peripheral. The image processing apparatus shown in FIG. 1 includes an image reading device 1, a storage device 2, a communication device 3, a printing device 4, an operation panel 5, and an arithmetic processor 6.

The image reading device 1 is an internal device that optically reads a document image from a document and generates image data (here, RGB data) of the document image.

The storage device 2 is a device capable of storing various data and programs. As the storage device 2, a nonvolatile mass storage medium such as a nonvolatile memory or a hard disk drive is used. The storage device 2 is provided with a document box 21. The storage device 2 stores document box management data 22.

The document box management data 22 includes setting data of the document box 21. The setting data of the document box 21 includes sharing setting data of the document box 21, password setting data of the document box 21, and the like. The sharing setting data includes ON/OFF of the sharing setting, a user condition (for example, a user attribute such as a user name or user authority) for permitting browsing or printing of the document in the document box 21, and the like. The password setting data is ON/OFF of password setting, a password for permitting browsing and printing of the document in the document box 21, and the like.

The communication device 3 includes a modem, a network interface, and the like, and performs data communication for facsimile transmission, file transfer, and the like.

In addition, the printing device 4 prints an image based on image data on a printing sheet by, for example, an electrophotographic method.

The operation panel 5 includes a display device 5a such as a liquid crystal display for displaying various screens to the user, and an input device 5b such as a touch panel and hard keys for detecting user operations.

The arithmetic processor 6 is a computer including a central processing unit (CPU), a read only memory (ROM), a random access memory (RAM), and the like. The arithmetic processor 6 functions as various processing units by loading a program from the ROM, the storage device 2, or the like to the RAM and executing the program by the CPU. In this embodiment, the arithmetic processor 6 functions as a controller 11 and a print job management unit 12.

The controller 11 controls internal devices such as the image reading device 1, the communication device 3, and the printing device 4, and appropriately executes image processing (screen processing or the like) on image data of a document designated by a job request such as a print job to generate image data for printing. Then, the controller 11 executes a print job using the printing device 4 based on the generated image data.

In addition, the controller 11 executes calibration of the printing device 4 when it is detected that a predetermined parameter (elapsed time, the number of printed pages, toner consumption, or the like) measured from the previous calibration exceeds a predetermined value (that is, at calibration timing). As the calibration, toner density calibration, toner gradation calibration, and the like are executed. For example, in calibration, a toner patch for calibration is developed, and the density of the toner patch is measured by an optical sensor. Therefore, when the calibration timing comes, the print job being executed is interrupted or stopped.

The print job management unit 12 receives a user's job request received from a host apparatus (not shown) by the communication device 3 or a user's job request input to the operation panel 5, and executes a print job for printing a document by the printing device 4 in accordance with the job request. In the print job, the print job management unit 12 causes the printing device 4 to execute printing using the controller 11.

For example, a job request of a print job is described in a page description language, and rasterization is performed by the controller 11. For example, in a job request of a box print job (a print job for printing a document stored in a document box), the document box or a document in the document box is designated.

The print job management unit 12 causes the controller 11 to execute a secure print job in accordance with a job request from the user. Specifically, when a secure print job is specified in the job request of the print job, the print job management unit 12 executes the requested print job as a secure print job. On the other hand, when the secure print job is not specified in the job request of the print job, the print job management unit 12 executes the requested print job as the non-secure print job.

Further, in the case of a job request for a box print job, when the predetermined setting of the document box 21 is a predetermined value, the print job management unit 12 executes the box print job as a secure print job. When the predetermined setting of the document box 21 is not a predetermined value, the print job management unit 12 executes the box print job as a non-secure print job.

Specifically, the print job management unit 12 refers to the document box management data 22 and determines whether the sharing setting of the document box 21 designated by the job request is OFF. When the sharing setting of the document box 21 is OFF, the print job management unit 12 executes the box print job as a secure print job. On the other hand, when the sharing setting of the document box 21 is ON, the print job management unit 12 executes the box print job as a non-secure print job. The print job management unit 12 refers to the document box management data 22 to determine whether the password setting of the document box 21 specified by the job request is ON. When the password setting of the document box 21 is ON, the print job management unit 12 executes the box print job as a secure print job. On the other hand, when the password setting of the document box 21 is OFF, the print job management unit 12 executes the box print job as a non-secure print job.

The secure print job is a print job for which authentication such as user authentication, Personal Identification Number (PIN) authentication, or password authentication is required at the time of starting printing. A non-secure print job is a print job for which such authentication is not required at the start of printing. The secure print job requires user authentication when the job is resumed after interruption. On the other hand, the non-secure print job does not require user authentication at the time of resuming the job after interruption.

In the user authentication, the user who is operating the image forming apparatus is specified by the user ID and the password input to the operation panel 5. If the identified user is the user who has made the job request for the box print job (or the user who is permitted to print the document in the document box 21), the user authentication is successful.

Further, upon receiving a job request for a secure print job as described above, the print job management unit 12 determines whether or not the difference between the current value of the parameter described above and the predetermined value is less than a predetermined threshold. When the difference is less than the predetermined threshold, the print job management unit 12 cancels the secure print job.

However, in this embodiment, when the difference is less than the predetermined threshold, the print job management unit 12 inquires of the user whether the secure print job can be executed. When execution of the secure print job is rejected by the user, the print job management unit 12 cancels the secure print job. On the other hand, when the user permits execution of the secure print job, the print job management unit 12 executes the secure print job.

When the difference is not less than the predetermined threshold, the print job management unit 12 determines whether or not a secure print job of another user different from the user is being executed or waiting. When the print job management unit 12 determines that there is no secure print job of another user being executed or waiting, if there is a resource allowing execution of all print jobs being executed or waiting, the print job management unit 12 executes the secure print job requested by the user. On the other hand, the print job management unit 12 rejects the secure print job requested by the user if there is no resource allowing execution of all the print jobs (regardless of the secure print job and the non-secure print job) being executed or waiting.

When the difference is not less than the predetermined threshold and it is determined that there is no secure print job of another user being executed or waiting, if there is no resource allowing execution of all print jobs being executed or waiting, the print job management unit 12 inquires of the user of the job request whether the requested secure print job can be executed. And, the print job management unit 12 cancels the secure print job when the execution of the secure print job is rejected by the user, and executes the secure print job when the execution of the secure print job is permitted by the user.

In addition, when the print job management unit 12 determines that there is a secure print job of another user who is executing or waiting, the print job management unit 12 inquires of the user of the job request whether the requested secure print job can be executed. Then, the print job management unit 12 cancels the secure print job when the execution of the secure print job is rejected by the user, and executes the secure print job when the execution of the secure print job is permitted by the user.

Next, the operation of the image forming apparatus will be described. FIGS. 2 and 3 are flowcharts illustrating a box print job in the image forming apparatus shown in FIG. 1.

Upon receiving the print job request (step S1), the print job management unit 12 determines whether the requested print job is a secure print job (step S2).

When the requested print job is a secure print job, the print job management unit 12 determines whether or not an operation interruption of the printing device 4 for calibration is approaching as described above (step S3).

When it is determined that the operation interruption of the printing device 4 for calibration is approaching, the print job management unit 12, upon receiving a print instruction (user operation for immediately executing printing of a secure print job) from the user through the operation panel 5 or the like (step S4), determines whether or not the user selects job execution permission based on predetermined setting data stored in the storage device 2 (step S5).

If the setting data indicates that the user does not select whether or not to execute the job, the print job management unit 12 does not execute the secure print job and displays a message indicating that the secure print job is to be canceled on the operation panel 5 (step S6).

On the other hand, if it is set by the setting data that the user selects whether or not to execute the job, the print job management unit 12 displays a screen inquiring whether or not to execute the secure print job on the operation panel 5. Then, the print job management unit 12 detects a user operation indicating whether to execute the secure print job on the operation panel 5, and determines whether to execute the secure print job based on the user operation (step S7).

When it is determined that the secure print job is not to be executed based on the user operation, the print job management unit 12 does not execute the secure print job, and displays a message indicating the cancel of the secure print job on the operation panel 5 (step S6). On the other hand, when it is determined to execute the secure print job based on the user operation, the print job management unit 12 executes the secure print job using the controller 11 (step S8).

As described above, when it is determined that the interruption of the operation of the printing device 4 for calibration is approaching, the secure print job is canceled in principle, but it can be exceptionally executed according to the user operation.

On the other hand, when it is determined that the interruption of the operation of the printing device 4 for calibration is not approaching, the print job management unit 12 determines whether or not a secure print job of another user is being executed or is waiting (step S11). It should be noted that the waiting print job is registered in the print queue, and it is determined whether or not a secure print job of another user is registered in the print queue for the waiting print job.

When there is no secure print job of another user being executed or waiting, print job management unit 12, upon receiving a print instruction (user operation for immediately executing printing of the secure print job) from the user through operation panel 5 or the like (step S12), displays a message indicating that the check of resources required to complete the requested secure print job is in progress on the operation panel 5 (step S13), and specifies the resources (estimated amount of printing sheets used) required to complete the requested secure print job and the current resources (remaining amount of printing sheets) in the printing device 4 (step S14).

Specifically, the print job management unit 12 specifies the total number of printed sheets of the print jobs being executed and waiting, and the remaining amount of printing sheets in the sheet feeding unit such as the sheet feeding tray. The remaining amount of printing sheets in the sheet feeding unit is specified by a sensor or the like.

Print job management unit 12 determines whether or not the amount of resources required to complete the requested secure print job is sufficient (step S15), and if the amount of resources is sufficient, displays a message indicating that the amount of resources is sufficient and the job is executable on operation panel 5 (step S16), and executes the requested secure print job (step S8).

On the other hand, if the resource is not sufficient (step S15), the print job management unit 12 executes the processing in step S5 and the subsequent steps.

If there is a secure print job of another user (step S11), the print job management unit 12 executes the processing in step S4 and subsequent steps.

Whereas, if the requested print job is a non-secure print job, the print job management unit 12 immediately executes the non-secure print job (step S21).

As described above, according to the embodiment, the controller 11 executes the calibration of the printing device 4 when it is detected that the predetermined parameter measured from the previous calibration exceeds the predetermined value. Upon receiving a job request for a secure print job, the print job management unit 12 determines whether or not the difference between the current value of the parameter and the predetermined value is less than a predetermined threshold. If the difference is less than the predetermined threshold, the print job management unit 12 cancels the secure print job in principle.

As a result, when there is a high possibility that the secure print job is interrupted by calibration, the secure print job is not automatically executed, and the possibility that the secure print job is interrupted is reduced.

Various changes and modifications to the embodiments described above will be apparent to those skilled in the art. Such changes and modifications may be made without departing from the spirit and scope of the subject matter and without diminishing intended advantages. It is therefore intended that such changes and modifications be covered by the appended claims.

For example, in the above embodiment, the document box 21 may be provided in an external server (not shown), and in this case, the print job management unit 12 accesses the document box 21 of the external server using the communication device 3.

Further, in the above-described embodiment, in step S3, the print job management unit 12 may determine whether or not the operation interruption of the printing device 4 for calibration is approaching, and may determine whether or not the amount of resources required to complete the requested secure print job is sufficient. In this case, when the amount of resources required to complete the requested secure print job is not sufficient, the same processing as in the case where the operation interruption of the printing device 4 for calibration is approaching is executed, and when the amount of resources required to complete the requested secure print job is sufficient, the same processing as in the case where the operation interruption of the printing device 4 for calibration is not approaching is executed.

What is claimed is:

1. An image forming apparatus comprising:
a printing device;
a controller that controls the printing device; and
a print job management unit that executes a secure print job by the controller based on a job request from a user,
wherein the controller executes calibration of the printing device when the controller detects that a predetermined parameter measured from a previous calibration exceeds a predetermined value, and
wherein the print job management unit, upon receiving a job request for the secure print job, determines whether or not a difference between a current value of the predetermined parameter and the predetermined value is less than a predetermined threshold, and if the difference is less than the predetermined threshold, the print job management unit determines whether to cancel the secure print job in accordance with a predetermined setting data that indicates whether or not the user selects job execution permission.

2. The image forming apparatus according to claim 1, wherein when the difference is not less than the predetermined threshold, the print job management unit determines whether or not a secure print job of a different user other than the user is being executed or waiting, and wherein when the print job management unit determines that there is no secure print job of the different user being executed or waiting, if there is a resource allowing execution of all print jobs being executed or waiting, the print job management unit executes the secure print job, and if there is no resource allowing execution of all the print jobs being executed or waiting, the print job management unit rejects the secure print job.

3. The image forming apparatus according to claim 2, wherein when the difference is not less than the predetermined threshold and the print job management unit determines that there is no secure print job of the different user being executed or waiting, if there is no resource allowing execution of all the print jobs being executed or waiting, the print job management unit inquires of the user whether the secure print job is to be executed, and wherein the print job management unit cancels the secure print job when execution of the secure print job is rejected by the user, and executes the secure print job when the execution of the secure print job is permitted by the user.

4. The image forming apparatus according to claim 2, wherein when the difference is not less than the predetermined threshold and the print job management unit determines that there is the secure print job of the different user being executed or waiting, the print job management unit inquires of the user whether the secure print job is to be executed, and wherein the print job management unit cancels the secure print job when execution of the secure print job is rejected by the user, and executes the secure print job when the execution of the secure print job is permitted by the user.

5. The image forming apparatus according to claim 1, wherein in a case where the predetermined setting data indicates that the user does not select whether or not to execute the job, the print job management unit cancels the secure print job, and in a case where the predetermined setting data indicates that the user selects whether or not to execute the job, the print job management unit inquires of the user whether the secure print job is to be executed, to determine whether to execute or cancel the secure print job.

6. The image forming apparatus according to claim 5, wherein in a case where the print job management unit inquires of the user whether the secure print job is to be executed, the print job management unit cancels the secure print job when execution of the secure print job is rejected by the user, and executes the secure print job when the execution of the secure print job is permitted by the user.

\* \* \* \* \*